(12) United States Patent
Parrault

(10) Patent No.: US 7,177,361 B2
(45) Date of Patent: Feb. 13, 2007

(54) MODULATOR FOR ELECTROMAGNETIC SIGNALS TRANSMITTED BY A CONTACTLESS TRANSMISSION/RECEPTION SYSTEM

(75) Inventor: Olivier Parrault, Golfe Juan (FR)

(73) Assignee: ASK S.A., Sophia Antipolis (FR)

( * ) Notice: Subject to any disclaimer, the term of this patent is extended or adjusted under 35 U.S.C. 154(b) by 746 days.

(21) Appl. No.: 10/416,180

(22) PCT Filed: Sep. 13, 2002

(86) PCT No.: PCT/FR02/03130

§ 371 (c)(1),
(2), (4) Date: May 9, 2003

(87) PCT Pub. No.: WO03/025832

PCT Pub. Date: Mar. 27, 2003

(65) Prior Publication Data

US 2004/0051627 A1 Mar. 18, 2004

(30) Foreign Application Priority Data

Sep. 14, 2001 (FR) .................................. 01 11917

(51) Int. Cl.
H04L 27/00 (2006.01)

(52) U.S. Cl. ..................... 375/256; 375/259; 375/377; 307/104; 343/856; 343/857; 455/113; 455/114; 455/118; 455/126

(58) Field of Classification Search ................ 375/256, 375/259, 268, 269, 271–274, 300, 302, 303, 375/305, 377; 307/104; 343/856, 857, 895; 455/108, 110, 113, 118, 126
See application file for complete search history.

(56) References Cited

U.S. PATENT DOCUMENTS

| 5,451,958 A | * | 9/1995 | Schuermann ................. 342/42 |
|---|---|---|---|
| 5,712,630 A | | 1/1998 | Nanboku et al. ....... 340/825.54 |
| 6,122,492 A | | 9/2000 | Sears .......................... 455/127 |
| 2002/0105065 A1 | | 8/2002 | Parrault ....................... 257/679 |
| 2002/0105232 A1 | | 8/2002 | Parrault ....................... 307/104 |

* cited by examiner

Primary Examiner—Dac V. Ha
(74) Attorney, Agent, or Firm—James C. Lydon

(57) ABSTRACT

A data transmission device using electromagnetic wave radiation in a contactless transceiver system toward a contactless object, the data bits transmitted corresponding to the half cycle of an initial time interval during which electromagnetic waves are emitted at a predetermined carrier frequency and to a second splitting time interval during which there is a split in transmission of the electromagnetic waves at the predetermined carrier frequency. During said second splitting time interval, generation means (40, 42, 44, 46, 48) generate electromagnetic waves having a frequency which is double the predetermined carrier frequency resulting in an attenuation of the radiated field by the antenna greater than a predetermined value such as 30 dB.

9 Claims, 2 Drawing Sheets

MODULATOR FOR ELECTROMAGNETIC SIGNALS TRANSMITTED BY A CONTACTLESS TRANSMISSION/RECEPTION SYSTEM

This application is a U.S. National Stage of International Application PCT/FR02/03130, filed Sep. 13, 2002 and published on Mar. 27, 2003 in the French Language.

TECHNICAL FIELD

This invention concerns electromagnetic signal transmission antennas located in contactless transceiver system readers and designed to emit electromagnetic signals toward portable contactless objects, and specifically concerns a modulator for electromagnetic signals emitted by a contactless transceiver system.

BACKGROUND ART

The exchange of information between a contactless object and a contactless transceiver system is generally accomplished by remote electromagnetic coupling between the first antenna located in the contactless object and the second antenna located in the contactless transceiver system. Furthermore, the object is equipped with an electronic module featuring the first antenna connected to an electronic chip which contains, among other elements, a radio-frequency (RF) part, a microprocessor and/or a memory in which the information to be provided to the contactless transceiver system and the logic functions required to compile the information to be transmitted and to process the information received.

The contactless object, which may be a ticket or credit card format card, is a system which is being increasingly used in various sectors. For example, in the transportation sector, the disposable contactless ticket and the contactless smart card were developed as a means of payment for both occasional and regular users. The same holds true for the electronic wallet. Many companies have also developed identification means for their personnel using contactless smart cards.

At present, data transmissions between the contactless transceiver system, commonly referred to as the reader, and contactless smart cards are subject to ISO standards. Among the most widely spread, the standard ISO 14443 concerns data transmission via radio between a smart card and a reader and vice versa. This standard covers two transmission protocols known as type "A" transmission protocol and type "B" transmission protocol. These two data contactless data transmission protocols, A and B, differ in terms of the type of modulation used for Radio Frequency (RF) communication between the reader and the card on the one hand, and the card and the reader on the other hand. Only the signals transmitted from the reader to the card will be dealt with here.

In the direction of data transmission from the reader to the card, protocol B provides amplitude modulation corresponding to a modulation rate of 10 percent of the signal emitted or of the electromagnetic carrier wave by the data transmitted, while in protocol A, the electromagnetic carrier wave is modulated at 100 percent of its amplitude by the data transmitted. In both cases, the amplitude of the periodic electromagnetic carrier wave emitted is maximum by default during the first time interval t1 then, during the second time interval, for the first case, it is equal to approximately 82 percent of the maximum amplitude during the modulation while in the second case, it is equal to 0 percent of the maximum amplitude during the modulation time.

At present, an increasing number of standards require that contactless readers to be compatible with both transmission protocol types, A and B. The standardized electromagnetic carrier wave frequency is common to both protocols and is generally equal to 13.56 MHz.

One of the major performance criteria for a reader is the range of the electromagnetic radiated field which must be as large as possible. Thus, manufacturers attempt to develop the range of their transmission system by means other than increasing the voltage source. However, the increase in range must not present the risk of saturating or destroying the card when placed near the reader.

One of the factors for satisfying this performance criterion is the use of antennas which have a high overvoltage ratio. At the resonance frequency, the rms voltage at the terminals of the inductance, a source of electromagnetic carrier waves, is substantially equal to Q times the voltage at the terminals of the circuit; Q being the overvoltage factor. In this manner, the more the antenna presents a high overvoltage ratio, the greater is the range of its radiated field.

In order to obtain modulation of the signal emitted at 100 percent of its amplitude, the method commonly used at present consists in switching the voltage source off at the terminals of the circuit for the time corresponding to the split of the field according to protocol A, in order to stop the electromagnetic carrier wave from being transmitted.

In practice, switching off the generator drops the voltage to zero although significantly increases the impedance of the antenna's driving circuit. This results in the antenna continuing to emit owing to the loads accumulated in the circuit, which results in a dampened and oscillating emitted electromagnetic carrier wave for a time greater than the splitting time. As a result, during the signal split, the amplitude of the field radiated toward the card is not zero and the field emitted by the antenna thus does not correspond to a modulation of 100 percent of the amplitude of the electromagnetic carrier wave; this takes place for a time less than the theoretical split time, the amplitude being less than or equal to 5 percent of the maximum amplitude of the radiated signal.

Consequently, the use of an antenna with a high overvoltage ratio is compatible with a B type reader. For such a reader, the electromagnetic carrier wave is always active as it is modulated at only 10 percent of its amplitude while it is poorly compatible with an A type reader. Furthermore, the small dampening effect obtained with an antenna having a high overvoltage ratio only slightly influences the shape of a wave modulated at 10 percent of its amplitude.

In order to use an antenna which is compatible for both reader types, a first solution consists in using an antenna having a reduced overvoltage ratio and with damping compatible with the requirements of standard A, although at the expense of the performance characteristics under standard B.

A second solution consists in using a linear amplifier with bipolar transistors, which enables the signal emitted by the antenna to be dampened so that the radiated field is zero during the splitting time. This solution allows the expected damping to be obtained at the expense of yield. The circuit has constant output impedance, although requires high polarization currents. Implementation of the circuit is more complex.

A third solution consists in using field effect transistors for switching, in order to reduce losses and to not penalize the range of the B type reader. Using such transistors switches the circuit between the "open" and "closed" positions and allows a maximum radiated field to be obtained by increasing the impedance presented when the circuit is open sustainably but at the expense of the wave form in the case of the type A protocol.

DISCLOSURE OF THE INVENTION

This is why a first object of the invention is to provide a device enabling the transmission of an electromagnetic carrier wave from the antenna of the reader toward the contactless smart card under maximum performance conditions during the emission of type A protocol signals.

A second object of the invention is to provide a device enabling the transmission of an electromagnetic carrier wave from the antenna of the reader toward the contactless smart card under maximum performance conditions during the emission of type A and type B protocol signals.

The purpose of the invention thus concerns a data transmission device using electromagnetic wave radiation in a contactless transceiver system toward a contactless object, the data bits transmitted corresponding to the alternation of a first time interval during which electromagnetic waves are emitted at a predetermined carrier frequency and a second splitting time interval during which there is a split in the transmission of the electromagnetic waves at the predetermined carrier frequency. The device includes generation means for generating, during the second splitting time interval, electromagnetic waves with a frequency greater than the fundamental frequency of the split resulting in an attenuation of the radiated field by the antenna greater than a predetermined value.

BRIEF DESCRIPTION OF THE FIGURES

The purposes, objects and characteristics of the invention will become more apparent from the following description when taken in conjunction with the accompanying drawings in which.

DETAILED DESCRIPTION OF THE INVENTION

The data are transmitted from the reader to the smart card via RF signals according to the two data transmission protocol types A and B subject to current standards. Type A protocol modulates the electromagnetic wave emitted by the reader at 100 percent of its amplitude. The amplitude of the periodic carrier frequency wave is maximum and constant during an initial time interval then zero during a second time interval. Type B protocol modulates the electromagnetic wave emitted by the reader at 10 percent of its amplitude. The amplitude of the periodic carrier frequency wave is maximum and constant during an initial time interval then equal to 10 percent of its maximum amplitude during a second time interval. As a de facto standard, the frequency of the electromagnetic carrier wave is currently equal to 13.56 MHz and this is why this value is chosen as the reference value in this document. However, the frequency of the electromagnetic carrier wave may be different without deviating from the scope of the invention.

According to type A data transmission protocol, the electromagnetic carrier wave is split for a time interval t by splitting of the 13.56 MHz transmitting frequency.

Figure 1:
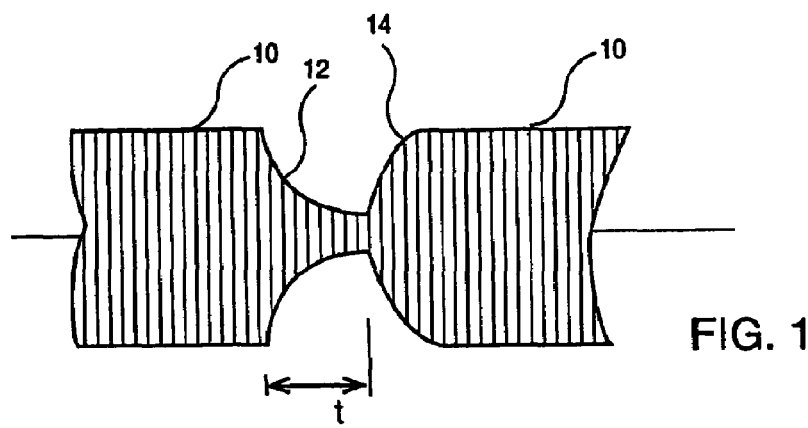
FIG. 1 represents the envelope of the field emitted according to protocol A, obtained by splitting the frequency of the carrier wave.

The envelope of the field thus radiated by the reader's antenna is represented in FIG. 1. While the frequency of the carrier frequency is equal to 13.56 MHz, the radiated field 10 is maximum. When the frequency is split, the radiated field decreases progressively according to the curve 12 until it reaches a minimum value other than zero at the end of the time interval t. At the end of the time interval t, the frequency of the carrier wave is again equal to 13.56 MHz and the amplitude of the radiated field increases according to the curve 14 until it reaches its maximum 10. In this manner, the modulation obtained from the amplitude of the carrier wave is not satisfactory when it is a modulation at 100 percent of the maximum amplitude. Such modulation is obtained when a minimum value of the amplitude of the radiated field is obtained (the standard currently requires less than 5 percent of the maximum amplitude) during a certain time in the time interval t. Now, when the carrier wave frequency represented by curve 12 is split, the reduction of the radiated field is not significant enough to obtain a satisfactory wave form in terms of modulation at 100 percent of the maximum amplitude.

Figure 2:
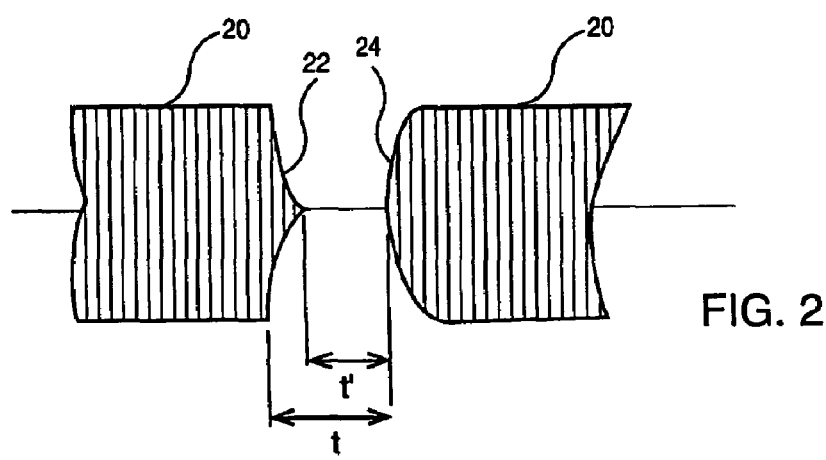
FIG. 2 represents the envelope of the field emitted according to the invention.

FIG. 2 represents the envelope of the field radiated by the reader's antenna by the device according to the invention. While the frequency of the carrier frequency is equal to 13.56 MHz, the radiated field 20 is maximum. In order to obtain a split of the amplitude of the carrier wave during time t, the frequency of the signal sent toward the antenna is thus double the resonance frequency during time t. The antenna thus receives a signal having a frequency of 27.12 MHz and no field is radiated by the antenna as this frequency is defined as being outside the antenna's bandwidth. In reality, the radiated field obtained during the frequency change decreases rapidly along a very damped curve 22 until it reaches a negligible value during a significant time t'. When the frequency of the electromagnetic carrier wave is 13.56 MHz, the field 24 radiated by the antenna increases until it reaches its maximum value 20. The wave-shape obtained is thus satisfactory in terms of modulation at 100 percent of the maximum amplitude. This result may be obtained with a frequency of the signal emitted outside the antenna's bandwidth and greater than the fundamental frequency of the split.

Figure 3:
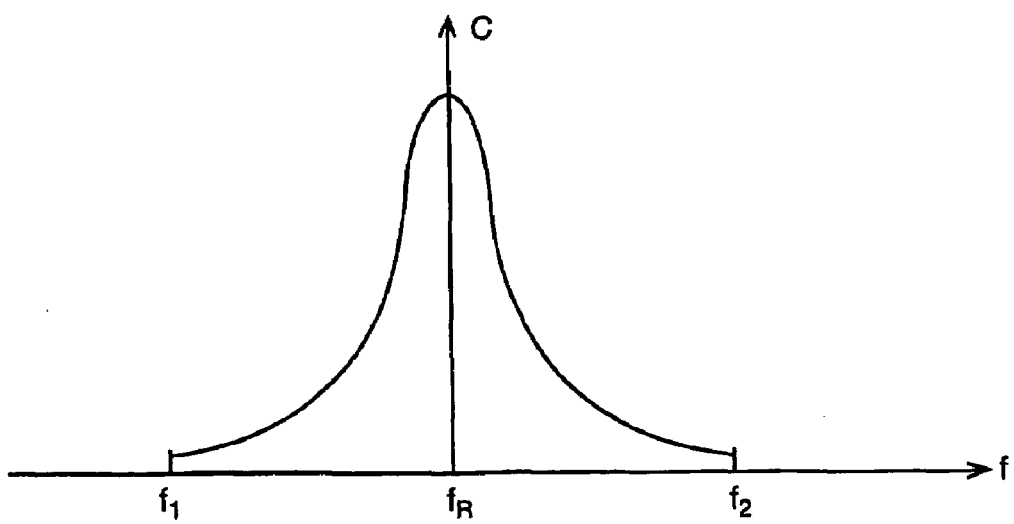
FIG. 3 represents the amplitude curve of the field radiated by the antenna in relation to the frequency of the signal received.

The field radiated by the antenna is illustrated in FIG. 3 according to the frequency of the signal received by the antenna. This field is maximum at the resonance frequency $f_R$. For a frequency less than or equal to the frequency $f_1$, the amplitude of the radiated field is less than 5 percent of the amplitude of the radiated field at the resonance frequency $f_R$. In the same manner, $f_2$ represents the frequency above which the amplitude of the radiated field is less than 5 percent of the amplitude of the field radiated at the resonance frequency. At the frequency generated during the split satisfactory to obtain a variable field split according to protocol A, the amplitude of the field radiated by the antenna must be less than 5 percent of the maximum amplitude of the radiated field. The frequency generated during the cut-off must thus be such that it results in an attenuation of the radiated field equal to a predetermined value, this value preferably being equal to 30 dB. The frequency generated during the split is either less than $f_1$ and other than zero, or greater than $f_2$. In a preferred embodiment, it is greater than or equal to 2 times $f_R$. According to the preferred embodiment of the invention, the frequency generated during the split is equal to two times the resonance frequency, that is 27.120 MHz.

Figure 4:
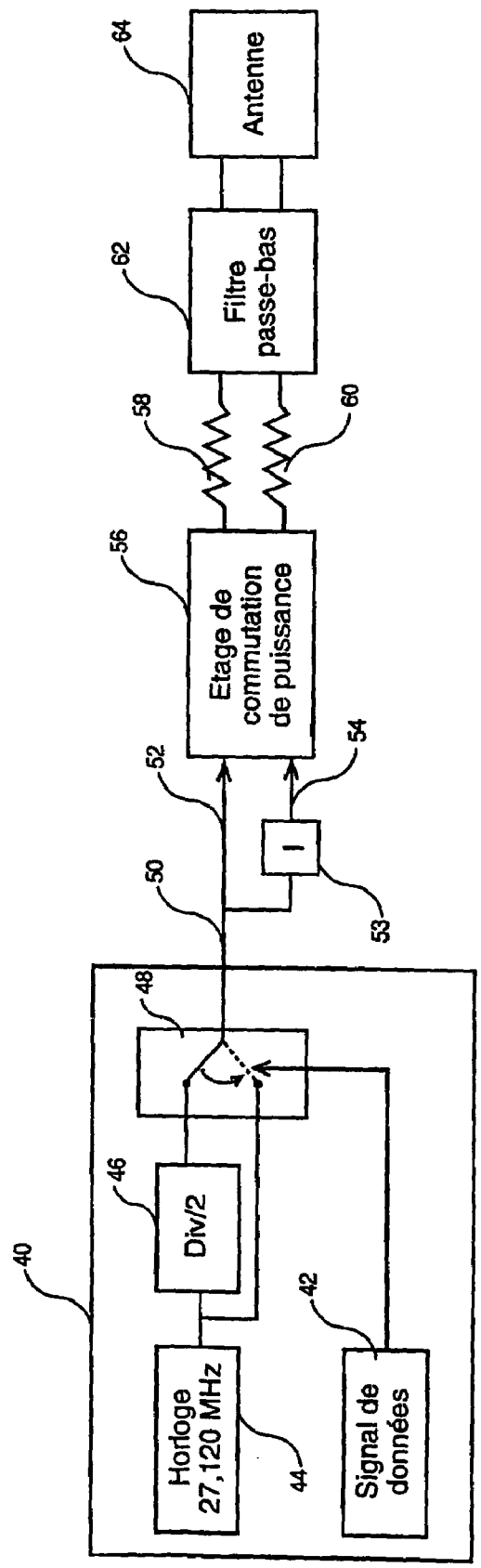
FIG. 4 is a block diagram of the functions of the device according to the invention.

The electronic device shown in block diagram format in FIG. 4 represents a preferred embodiment of the invention in which the data signal 42 controls a two-position switch 48. The first position corresponds to a signal whose frequency is equal to 27.120 MHz generated during the split provided by a clock 44. The second position corresponds to a signal whose frequency is equal to the standard frequency of 13.56 MHz generated by a frequency divider 46. The means above are included in programmable logic 40, the output signal 50 of which is applied to the power switching stage by two inputs, input 52 corresponding to the output signal of the programmable logic 40 while the other input 54 is this same output signal inverted by a change-over switch 53. The power switching stage 56 includes two field effect transistors connected to both inputs 52 and 54 respectively and intended to switch to the frequency received by one of the two inputs, one of the transistors being "open" while the other transistor is "closed". Both output signals from the power switching stage pass by two resistors 58 and 60 before being filtered by a low-pass filter 62 designed to allow only fundamental frequency signals through. On the output of filter 62, the two signals are emitted by the antenna 64 toward the contactless card.

The invention claimed is:

1. A transmission device using electromagnetic wave radiation in a contactless transceiver system toward a contactless object, data bits transmitted corresponding to alternation of a first time interval during which electromagnetic waves are emitted at a predetermined carrier frequency and a second splitting time interval during which there is a split in transmission of the electromagnetic waves at said predetermined carrier frequency, further comprising generation means for generating, during said second splitting time interval, electromagnetic waves with a frequency greater than the fundamental frequency of the split resulting in an attenuation of the radiated field by the antenna greater than a predetermined value.

2. The data transmission device of claim 1, wherein said attenuation of the radiated field at said frequency generated during the split is less than or equal to 30 dB.

3. The data transmission device of claim 2, wherein said frequency generated during the split is outside a frequency range f1–f2 corresponding to an amplitude of the field radiated by the antenna greater than or equal to 5 percent of the amplitude of the field radiated at said predetermined carrier frequency.

4. The data transmission device of claim 3, wherein said frequency generated during the split is equal to double of said predetermined carrier frequency.

5. The data transmission device of claim 4, further comprising programmable logic supplying a first signal at said predetermined carrier frequency for an initial time interval and a second signal having a frequency which is double that of said predetermined carrier frequency during a second time interval, the switching between said first signal and said second signal being controlled by the data signal.

6. The data transmission device of claim 5, wherein said predetermined carrier frequency is equal to 13.56 MHz.

7. The data transmission device of claim 6, wherein said programmable logic includes a clock operating at 27.12 MHz and a frequency divider supplying said predetermined carrier frequency (13.56 MHz), the double frequency (27.12 MHz) being provided by said clock.

8. The data transmission device of claim 7, further comprising a power switching stage featuring two field effect transistors controlled by the outputs of said programmable logic such that one of said transistors is "open" while the other transistor is "closed".

9. The data transmission device of claim 1, wherein the data transmitted are compliant with the data transmission standard ISO 14443 according to type A protocol in which the data bits are generated by splits of the electromagnetic field emitted.

* * * * *